(12) United States Patent
Zhang et al.

(10) Patent No.: US 10,404,013 B2
(45) Date of Patent: Sep. 3, 2019

(54) DETACHABLE PLUG-IN CONNECTOR

(71) Applicant: LINHAI YONGHENG AUTO TECHNOLOGY CO., LTD., Taizhou (CN)

(72) Inventors: Huiming Zhang, Taizhou (CN); Xingjuan Wang, Taizhou (CN)

(73) Assignee: LINHAI YONGSHENG AUTO TECHNOLOGY CO., LTD., Taizhou (CN)

( * ) Notice: Subject to any disclaimer, the term of this patent is extended or adjusted under 35 U.S.C. 154(b) by 0 days.

(21) Appl. No.: 16/028,357

(22) Filed: Jul. 5, 2018

(65) Prior Publication Data

US 2018/0331471 A1 Nov. 15, 2018

Related U.S. Application Data

(63) Continuation of application No. PCT/CN2016/087021, filed on Jun. 24, 2016.

(30) Foreign Application Priority Data

Jan. 8, 2016 (CN) .......................... 2016 1 0010642

(51) Int. Cl.
*H01R 13/639* (2006.01)
*F16L 33/30* (2006.01)
(Continued)

(52) U.S. Cl.
CPC ............ *H01R 13/639* (2013.01); *F16L 33/30* (2013.01); *F16L 37/088* (2013.01); *F16L 37/144* (2013.01); *H01R 13/6277* (2013.01)

(58) Field of Classification Search
CPC . H01R 13/639; H01R 13/6277; F16L 37/088; F16L 37/144
(Continued)

(56) References Cited

U.S. PATENT DOCUMENTS 4,302,066 A * 11/1981 Newman ............ H01R 13/6395
439/347
5,607,324 A * 3/1997 Saur ..................... H01R 13/745
248/27.3

(Continued)

*Primary Examiner* — Alexander Gilman
(74) *Attorney, Agent, or Firm* — Hemisphere Law, PLLC; Zhigang Ma

(57) ABSTRACT

The present application relates to a detachable plug-in connector, which includes an insertion tube having a lock engaging portion, a receiving part for accommodating the insertion tube, and a self-locking member for limiting the movement of the insertion tube. The self-locking member is accommodated in the receiving part. The self-locking member comprises two limiting arms each defining a limiting protrusion, an elastic bending portion connected between the two limiting arms, and two moving portions. The receiving part comprises a limiting arm separating portion configured for cooperating with the moving portions. The moving portions are fixed at inner sides facing towards each other of the two limiting arms. The surfaces of the moving portions adjacent to the limiting arm separating portion are inclined surfaces that facilitate the two limiting arms move away from each other when the moving portions and the limiting arm separating portion squeeze against each other.

9 Claims, 9 Drawing Sheets

(51) Int. Cl.
  *F16L 37/14* (2006.01)
  *H01R 13/627* (2006.01)
  *F16L 37/088* (2006.01)
(58) Field of Classification Search
  USPC .......................................................... 439/345
  See application file for complete search history.

(56) References Cited

U.S. PATENT DOCUMENTS

| | | | | |
|---|---|---|---|---|
| 5,941,730 A * | 8/1999 | Uchiyama | ............... | F02M 37/10 |
| | | | | 439/550 |
| 7,976,320 B2 * | 7/2011 | Nishimura | ............ | H01R 13/502 |
| | | | | 439/607.34 |
| 8,758,038 B2 * | 6/2014 | Kubo | ................. | H01R 13/6272 |
| | | | | 439/358 |

* cited by examiner

|  | Pull out force | SPEC |
|---|---|---|
| Unit | N | N |
| Sample 1 | 1123.08 | 450 |
| Sample 2 | 1241.96 | 450 |
| Sample 3 | 1254.27 | 450 |
| Sample 4 | 1157.28 | 450 |
| Max | 1254.27 | 450.00 |
| Min | 1123.08 | 450.00 |
| Median value | 1199.62 | 450.00 |
| Average value | 1194.15 | 450.00 |
| Standard deviation(n) | 55.48 | 0.00 |

|  | Insertion force | SPEC |
|---|---|---|
| Unit | N | N |
| Sample 1 | 18.52 | 111 |
| Sample 2 | 20.96 | 111 |
| Sample 3 | 22.64 | 111 |
| Sample 4 | 17.63 | 111 |
| Max | 22.64 | 111.00 |
| Min | 17.63 | 111.00 |
| Median value | 19.74 | 111.00 |
| Average value | 19.94 | 111.00 |
| Standard deviation(n) | 1.98 | 0.00 |

DETACHABLE PLUG-IN CONNECTOR

FIELD OF THE DISCLOSURE

The disclosure relates to the field of connector technologies, and more particularly to a detachable plug-in connector.

BACKGROUND

Patent publication CN1916474A discloses a releasable plug-in connector (removable plug-in connector) for inserting a tubular insert having a peripheral flange. This connector includes a cylindrical insertion chamber housing that receives the insertion of a tubular insert and a separate locking ring (self-locking device) made of a rigid/elastic plastic. The locking edge of the ring is inwardly in a circular arc shape. When the tubular insert is pushed into the connector, the arc-shaped edge is pushed apart, and then the insert is pushed into and locked to the element in the connector, the arc-shaped edge is rebounded and engaged with the flange. The distal ends of the locking edge are connected to each other by a pair of V-shaped elastic arms, and the elastic arms are accessible from the outside of the connector housing to push them into the unlocked position to pull the insert from the connector.

Patent document CN1751202A discloses a quick connector dust coyer and a quick connector (removable plug connector) that cannot lock a stopper (self-locking device) as long as a dust cover is inserted. An O-ring protector and an interference part that interferes with a part of a stopper (self-locking device) are integrally provided on the cylindrical dust cover body, and the dust cover body is inserted into the shell of the quick connector. In the body, the O-ring is externally fitted on the O-ring protector, and the interference portion restricts the stopper (self-locking device) to a position where it cannot be locked.

The complexity of the self-locking structure of the existing detachable plug-in connector is very inconvenient to install.

SUMMARY

On such basis, it is necessary to provide a detachable plug-in connector with simple structure and easy to be assembled.

In one embodiment, the disclosure provides a detachable plug-in connector. The detachable plug-in connector includes an insertion tube, a receiving part, and a self-locking member. The insertion tube comprises a lock engaging portion and a receiving part. The insertion tube is inserted into the receiving part, and the insertion tube is sealedly and detachably assembled with the receiving part. The self-locking member is accommodated in the receiving part and cooperates with the lock engaging portion limit a moving range of the insertion tube. The self-locking member comprises two limiting arms, an elastic bending portion, and two moving portions. Each of the two limiting arms has a limiting protrusion and a free end. Two ends of the elastic bending portion respectively are fixedly connected to the limiting arms. The two moving portions are fixed at connections between the limiting arms and the elastic bending portion, and the two moving portions are located at inner sides facing towards each other of the two limiting arms. The receiving part comprises a limiting arm separating portion positioned between the two limiting arms. The moving portions and the limiting arm separating portion squeeze against each other when the elastic bending portion is pressed, and thereby the two limiting arms move away from each other to release a limiting of the self-locking member applied to the insertion tube.

In one embodiment, the receiving part further comprises an outer wall, an inner wall, and connecting portions; the connecting portions connect the outer wall and the inner wall to form a space for accommodating the self-locking member, the outer wall is defined with grooves; when the lock engaging portion squeezes against the limiting protrusions of the limiting arms, the limiting arms are partially accommodated in the grooves, and first side walls of the grooves cooperate with limiting arm outer surfaces of the limiting arms to limit a movement of the limiting arms in a direction away from the insertion tube.

In one embodiment, surfaces of the moving portions adjacent to the limiting arm separating portion are inclined surfaces, and the elastic bending portion is a plate-shaped structure bent towards a direction facing away from an axis of the insertion tube.

In one embodiment, the outer wall and the inner wall are both perpendicular to the axis of the insertion tube, and the connecting portions are parallel to the axis of the insertion tube. The insertion tube passes through the outer wall and the inner wall, each of the outer wall, the inner wall and the connecting portions is a plate-shaped structure.

In one embodiment, first engaging protrusions are defined at surfaces of the connecting portions adjacent to the limiting arms respectively. First anti-falling protrusions are fixed on sides of the limiting arms adjacent to the connecting portions respectively. The first engaging protrusions cooperate with the first anti-falling protrusions to prevent the self-locking member from dropping out of the recessing part.

In one embodiment, the receiving part further comprises a limiting arm limiting portion fixed between the outer wall and the inner wall, and the limiting arm limiting portion also is located between the two limiting arms. Second anti-falling protrusions are respectively fixed on the inner sides facing toward each other of the free ends of the two limiting arms away from the elastic bending portion, and the second anti-falling protrusions pass through gaps formed by the limiting arm limiting portion and the connecting portion. The limiting arm limiting portion and the second anti-falling protrusions cooperate with each other to prevent the self-locking member from dropping out of the receiving part.

In one embodiment, there is a space between the elastic bending portion and the limiting arm separating portion to allow the elastic bending portion to be flattened when being pressed.

In one embodiment, limiting protrusions facing toward the outer wall are inclined surfaces or curved surfaces and configured for guiding the insertion of the insertion tube, surfaces of the limiting protrusions facing away from the outer wall are planes perpendicular to the axis of the insertion tube.

In one embodiment, the limiting arm separating portion is a curved plate-shaped structure being convex in a direction facing away from the axis of the insertion tube.

In one embodiment, at least one of the insertion tube, the receiving part and the self-locking member is/are made of a glass fiber modified nylon.

In the detachable plug-in connector of the disclosure, since the self-locking member includes an elastic bending portion and two limiting arms, the structure of the self-locking member is simple and easy to install.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
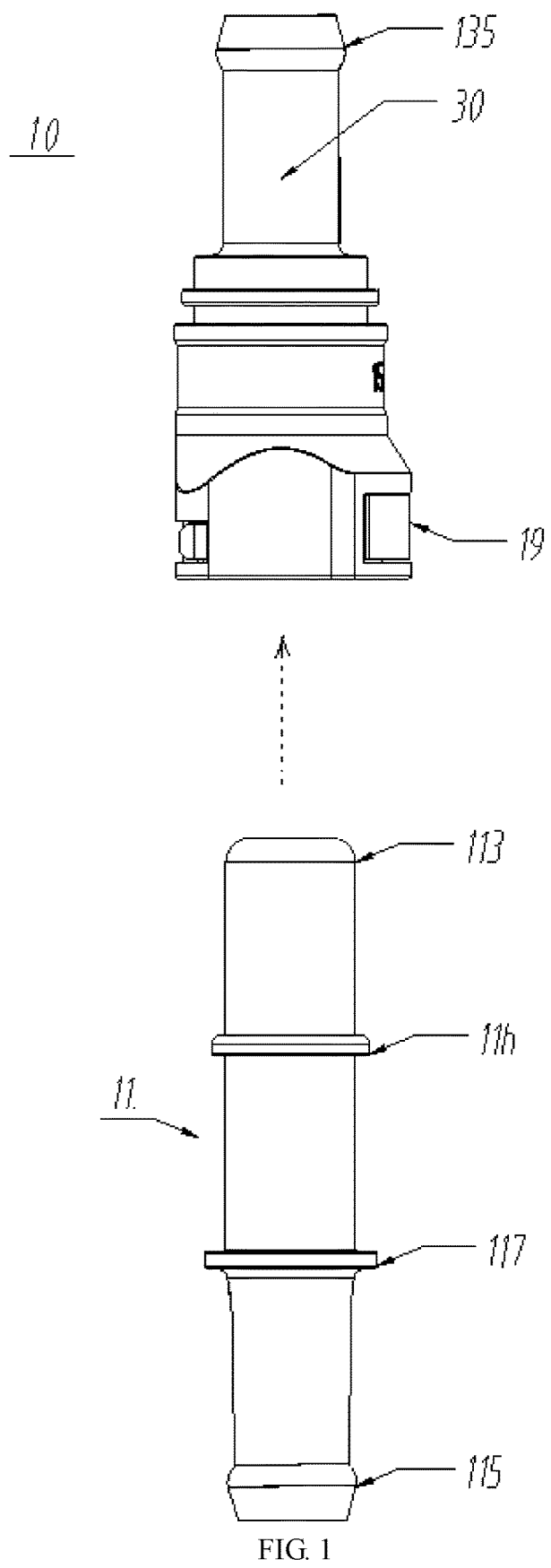
FIG. 1 is a schematic structural view of a detachable plug-in connector according to a first embodiment of the disclosure.

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "Vertical", "horizontal", "top", "bottom", "inside", "outside", etc, for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation with respect to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more features. In the description of the disclosure, unless otherwise indicated, the meaning of "plural" is two or more than two. In addition, the term "comprise" and any variations thereof are meant to cover a non-exclusive inclusion.

In the description of the disclosure, is should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described features, integers, steps, operations, units and/or components, but do not exclude the existence or addition of one or more other features, integers, steps, operations, units, components and/or combinations thereof.

The disclosure will be further described in detail with reference to accompanying drawings and preferred embodiments as follows.

Figure 2:
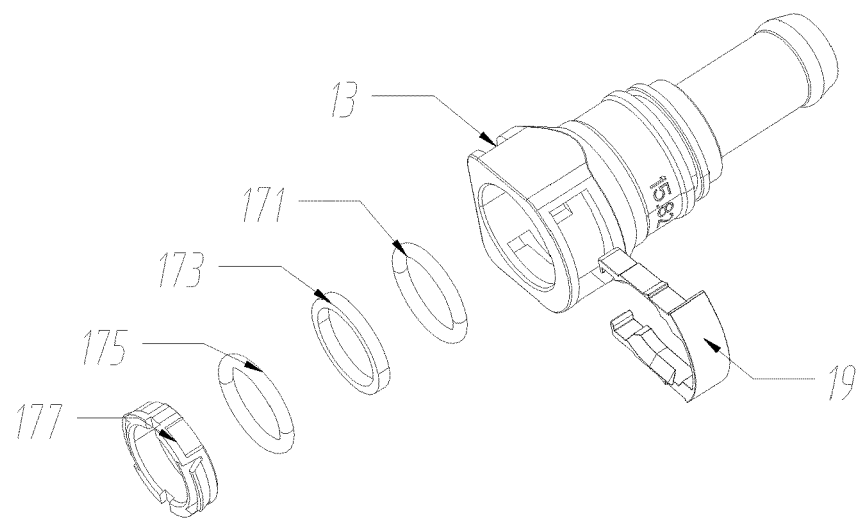
FIG. 2 is a schematic structural view of a receiving part of the detachable plug-in connector of FIG. 1 in a disassembled state.
Figure 3:
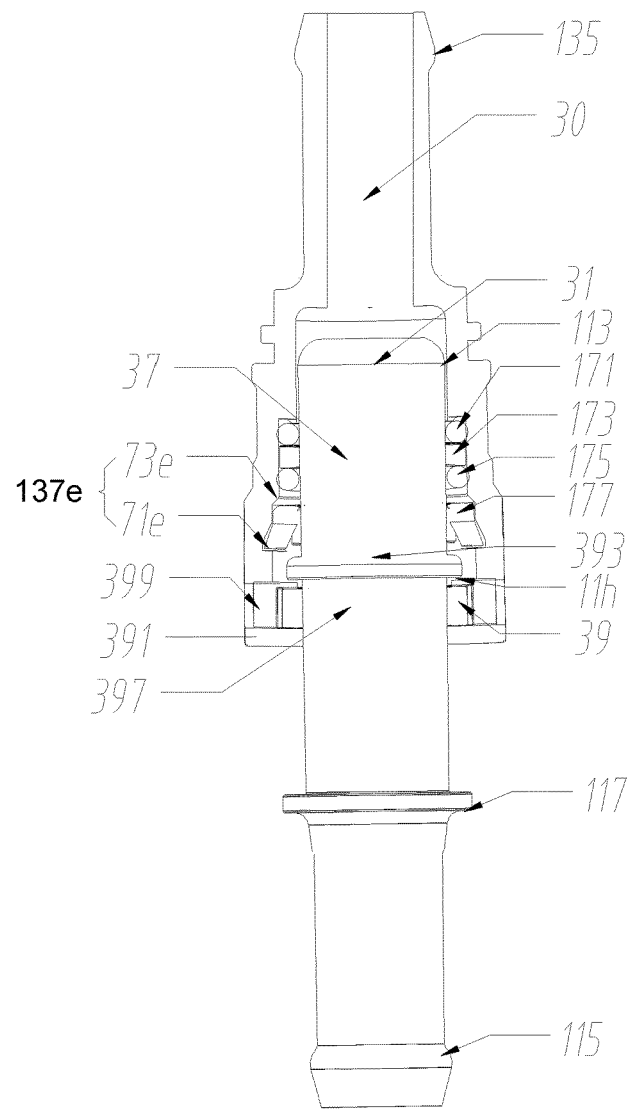
FIG. 3 is a cross-sectional schematic view of the detachable plug-in connector of FIG. 1 in an assembled state.

FIG. 1 is a schematic structural view of a detachable plug-in connector according to a first embodiment of the disclosure. FIG. 2 is a schematic structural view of a disassembled state of a receiving part of the detachable plug-in connector of FIG. 1. Please refer to FIG. 1 and FIG. 2, the detachable plug-in connector 10 of the present embodiment includes an insertion tube 11, the receiving part 13, a self-locking member 19, an inner O ring 171, a spacer ring 173, an outer O ring 175, and an outer baffle ring 177. FIG. 3 is a schematic cross-sectional view of an assembled and connected state of the detachable plug-in connector of FIG. 1. Please also referring to FIG. 3, when the detachable plug-in connector is assembled, the insertion tube 11 is inserted into the receiving part 13, the self-locking member 19 is located in the receiving part 13, the inner O ring 171, the spacer ring 173, the outer O ring 175, and the outer baffle ring 177 are located in the gap between the insertion tube 11 and the receiving part 13.

Please refer to FIG. 1, the insertion tube 11 is a hollow tube. The insertion tube 11 has a lock engaging portion 11*h*, an inserting guide portion 113, a sealing protrusion 115, and a limit protrusion 117. The lock engaging portion 11*h* is fixed in the middle of the insertion tube 11, the inserting guide portion 113 is fixed at the end of the insertion tube 11 toward the receiving part 13, and the sealing protrusion 115 is fixed adjacent to the end of the insertion tube 11 facing a way from the receiving part 13, the limit protrusion 117 is fixed between the sealing protrusion 115 and the lock engaging portion 11h.

The lock engaging portion 11h is configured for cooperating with the self-locking member 19 to lock the insertion tube 11, thereby preventing the insertion tube 11 from slipping out of the receiving part 13. The lock engaging portion 11h is a ring-shaped protrusion, and its cross-section may be rectangular, square, semi-circular or the like. In other embodiments of the disclosure, the lock engaging portion 11h may be a protrusion or a recess defined in the insertion tube 11.

The inserting guide portion 113 is used to gradually reduce the outer diameter of the insertion tube 11. The inserting guide portion 113 enables the insertion tube 11 to be more conveniently inserted into the receiving part 13. The inserting guide portion 113 is fixed at the end of the insertion tube 11 facing the receiving part 13. The cross-section of the inserting guide portion 113 is an annular sector, which is a part of an annulus cut by a fan. An inner diameter of the inserting guide portion 113 is the same as the inner diameter of the insertion tube 11. The outer surface of the inserting guide portion 113 facing away from the axis of the insertion tube 11 may be flat or concave. In other embodiment, the inner diameter of the inserting guide portion 113 may be not equal to the inner diameter of the insertion tube 11.

The sealing protrusion 115 serves to increase the pressure between the insertion tube 11 and a hose (not shown) when the insertion tube 11 is assembled and connected with the hose, thereby achieving the seal between the insertion tube 11 and the hose. The sealing protrusion 115 is an annular structure, and the diameter of the sealing protrusion 115 toward the hose is smaller than the diameter of the sealing protrusion 115 facing away from the hose, for the purpose of facilitating insertion of the hose. The number of the sealing protrusion 115 is not limited, may be one or more.

The limit protrusion 117 is configured to limit the relative position of the two when the insertion tube 11 is assembled with the hose, and serves as a reference for installing the hose in proper position. In other embodiments of the disclosure, the limit protrusion 117 is not necessary and may not be provided.

Figure 4:
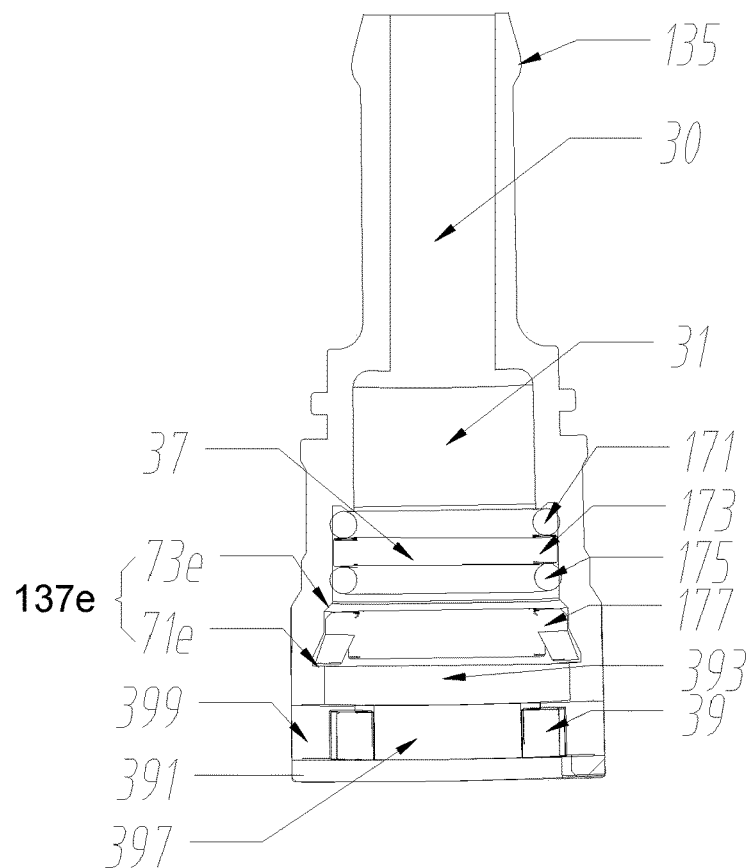
FIG. 4 is a cross-sectional schematic view of the receiving part of FIG. 1
Figure 5:
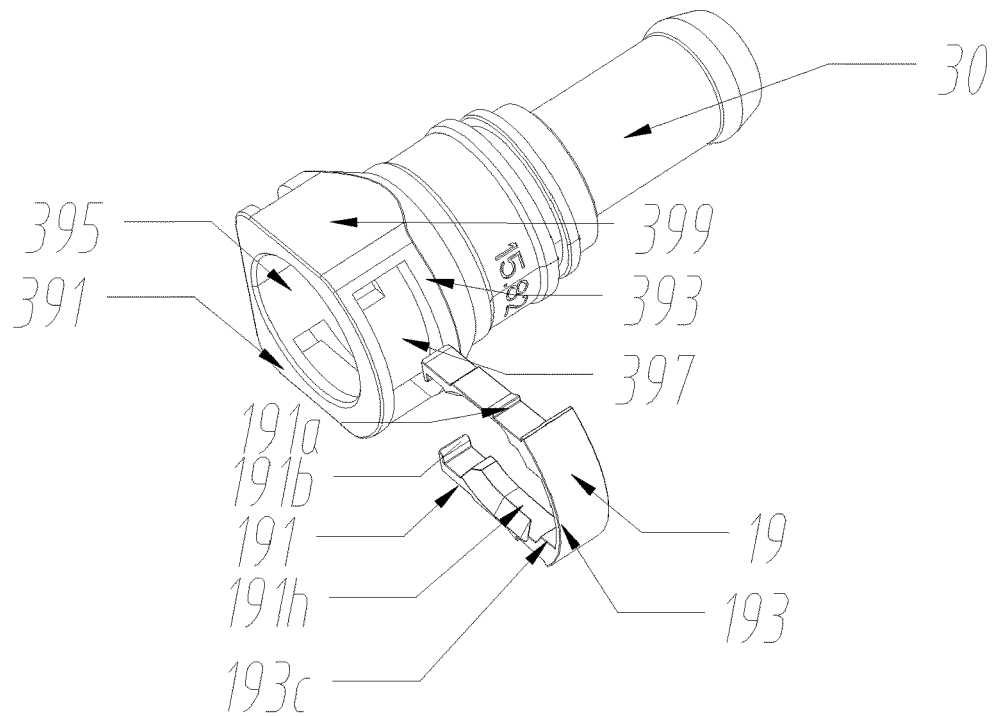
FIG. 5 is a perspective view of the receiving part and a self-locking member of FIG. 2.

FIG. 4 is a schematic cross-sectional view of the receiving part of FIG. 1. FIG. 5 is a schematic perspective view of the receiving part and the self-locking member of FIG. 2. Please refer to FIG. 4 and FIG. 5, the receiving part 13 includes a hose connecting portion 30, an insertion tube accommodating portion 31, a sealing accommodating portion 39, and a self-locking accommodating portion 37. The hose connecting portion 30, the insertion tube accommodating portion 31, the sealing accommodating portion 37, and the self-locking accommodating portion 39 are aligned and fixed in this order along an axis of the receiving part 13, in a direction toward the insertion tube 11. The hose connecting portion 30, the insertion tube accommodating portion 31, the sealing accommodating portion 37, and the self-locking accommodating portion 39 are integrally molded and communicate with each other inside.

The hose connecting portion 30 has a tubular structure. The outside of the hose connecting portion 30 fixedly defines a seal protrusion 135 for increasing the pressure between the receiving part 13 and the hose when the hose connecting portion 30 is assembled and connected to the hose, thereby achieving the seal between the receiving part 13 and the hose. The seal protrusion 135 is an annular structure, and the diameter of the seal protrusion 135 toward the hose is smaller than the diameter of the seal protrusion 135 facing away from the hose for the purpose of facilitating insertion of the hose. The number of the seal protrusion 135 is not limited, may be one or more.

The insertion tube accommodating portion 31 is for accommodating a portion of the insertion tube 11. The inner wall of the insertion tube accommodating portion 31 has a cylindrical cross-section, and the inner diameter of the insertion tube accommodating portion 31 is equal to or greater than the outer diameter of the portion of the insertion tube 11 corresponding to the insertion tube-accommodating portion 31.

The sealing accommodating portion 37 is configured for accommodating a portion of the insertion tube 11, the inner O ring 171, the spacer ring 173, the outer O ring 175, and the outer baffle ring 177. The inner wall of the sealing accommodating portion 37 is a smooth cylindrical surface, which can achieve better sealing effect. The diameter of the cross-section of the inner wall of the sealing accommodating portion 37 is larger than the diameter of the inner wall of the insertion tube accommodating portion 31. An end portion of the sealing accommodating portion 37 facing the insert ion tube 11, that is, the portion of the sealing accommodating portion 37 corresponding to the outer baffle ring 177, is provided with an baffle engaging portion 137e which includes an outer baffle ring recess portion 71e and an outer baffle ring blocking surface 73e. The baffle ring recess portion 71e is configured to prevent the outer baffle ring 177 from moving toward the insertion tube 11, and the baffle engaging portion 137e is configured to prevent the outer baffle ring 177 from moving away from the insertion tube 11.

The self-locking accommodating portion 39 includes an outer wall 391, an inner wall 393, a limiting arm limiting portion 395, a limiting arm separating portion 397, and connecting portions 399. The outer wall 391 and the inner wall 393 both are perpendicular to the axis of the insertion tube 11. The limiting arm limiting portion 395, the limiting arm separating portion 397, and the connecting portions 399 each are fixed between the outer wall 391 and the inner wall 393, and each are parallel to the axis of the insertion tube 11. This makes it possible to fully utilize the space in the self-locking accommodating portion 39 without interfering with the insertion of the insertion tube 11.

The outer wall 391 and the inner wall 393 are plate-shaped structures, and perpendicular to the axis of the insertion tube 11. The space between the outer wall 391 and the inner wall 393 can restrict the movement of the self-locking member 19 along the axis of the insertion tube.

The limiting arm limiting portion 395 is configured to prevent the self-locking member 19 from slipping out of the self-locking accommodating portion 39, when the insertion tube 11 is inserted into the receiving part 13.

The limiting arm separating portion 397 is a curved plate-shaped structure being convex in a direction facing away from the axis of the insertion tube (11), and is fixed between the outer wall 391 and the inner wall 393. The limiting arm separating portion 397 cooperates with the self-locking member 19, so that the self-locking member 19 can be in an open state, that is, in a state where the insertion tube 11 can be pulled out from the receiving part 13. In other embodiments of the disclosure, the limiting arm separating portion 397 may be fixedly connected with the connecting portion 399; and the shape of the limiting arm separating portion 397 may be a "-" shaped plate-like structure.

Each of the connecting portion 399 is a plate-shaped structure connecting the outer wall 391 and the inner wall 393, and serves to make the connection between the outer wall 391 and the inner wall 393 more tight. A socket for inserting the self-locking member 19 is formed among the connecting portions 399, the outer wall 391, and the inner wall 393. A first engaging protrusion 139a is provided on one side of each of the connecting portions 399 adjacent to the socket of the self-locking member 19. In other embodiments of the disclosure, the connecting portion 399 may be composed of several segments, and gaps may be formed between each two adjacent segments thereof.

Referring to FIG. 1, the inner O ring 171 is annular and its cross-section is circular. When the insertion tube 11 is inserted into the receiving part 13, the inner O ring 171 is located between the insertion tube 11 and the receiving part 13, that is, the inner O ring is sleeved outside the insertion tube 11. The circular diameter of the cross-section of the inner O ring 171 is larger than the gap between the insertion tube 11 and the receiving part 13. The inner O ring 171 is made of fluororubber (FKM), which has line oil-resistant and chemical-resistant properties, good physical and mechanical properties, weather resistance, electrical insulation, and radiation resistance that other rubbers do not have.

The spacer ring 173 is annular and has a rectangular cross-section. The spacer ring 173 is positioned between the inner O ring 171 and the outer O ring 175, and is made of glass fiber modified nylon. The spacer ring 173 is used to ensure the distance between the inner O ring 171 and the outer O ring 175, so as to ensure the sealing effect. When the insertion tube 11 is inserted into the receiving part 13, the spacer ring 173 is located between the insertion tube 11 and the receiving part 13, that is, the spacer ring 173 is sleeved outside the insertion tube 11. The cross-section of the spacer ring 173 may also be circular, square or other shapes.

The outer O ring 175 is annular and its cross-section is circular. When the insertion tube 11 is inserted into the receiving part 13, the inner O ring 171 is located between the insertion tube 11 and the receiving part 13, that is, the outer O ring 175 is sleeved outside the insertion tube 11. The circular diameter of the outer O ring 175 is larger than the gap between the insertion tube 11 and the receiving part 13. The outer O ling is made of fluorosilicone rubber (FVMQ), which has excellent resistance to aviation fuel oil, hydraulic oil, engine oil, chemical reagents, and solvents, in addition to its general rubber properties. It can work long term at −55° C.~+200° C.

Figure 6:
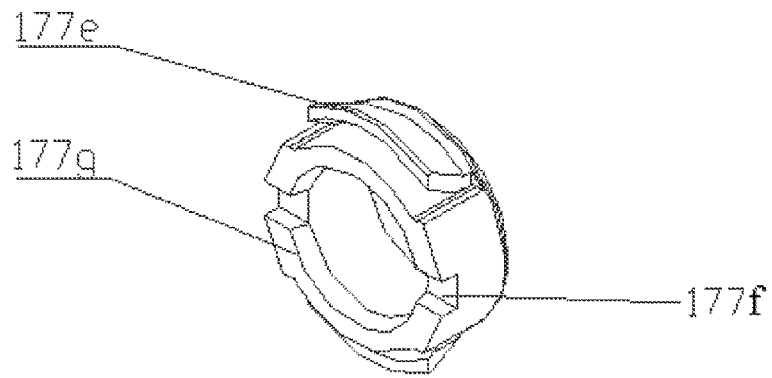
FIG. 6 is a schematic structural view of the outer baffle ring of FIG. 1.

FIG. 6 is a structural schematic view of the outer baffle ring of FIG. 1. Referring to FIG. 6 together, the outer baffle ring 177 is used to prevent the inner O ring 171, the spacer ring 173, and the outer O ring 175 from loosening. The outer baffle ring 177 includes an outer baffle ring restriction 177e and an outer baffle ring body 177g. The outer baffle ring body 177g is annular-shaped with a rectangular cross-section. Baffle restriction 177e is fixed to one side of the outer baffle ring body 177g that faces away from its center. The outer baffle ring body 177g is provided with a rotating portion 177f.

Baffle restriction 177e is an arc-shaped plate-like structure with a certain elasticity, and the side thereof facing away from the baffle ring body 177g is a free end.

The outer baffle ring 177 is made of glass liber modified nylon. When the insertion tube 11 is inserted into the receiving part 13, the outer baffle ring 177 is located between the insertion tube 11 and the receiving part 13, that is, the outer baffle ring 177 is sleeved outside the insertion tube 11. The cross-section of the outer baffle ring 177 may also be circular, square, or other shapes.

The baffle engaging portion 137c of the receiving part 13 cooperates with the baffle restriction 177e to achieve position limitation. The rotating portion 177f is provided on the side surface of the outer baffle ring 177 facing the insertion tube 11. The rotating portion 177f is configured to control the position of baffle restriction 177e when the outer baffle ring 177 is assembled, because it is very convenient to rotate the outer baffle ring 177 by rotating the rotating portion 177f until it is mounted at appropriate position. In the present embodiment, the rotating portion 177f is a groove penetrating through the outer baffle ring body 177g, and the groove has a rectangular cross-section. In other embodiments of the disclosure, the rotating portion 177f may also be a through hole or a blind hole, a protrusion, or the like.

Figure 7:
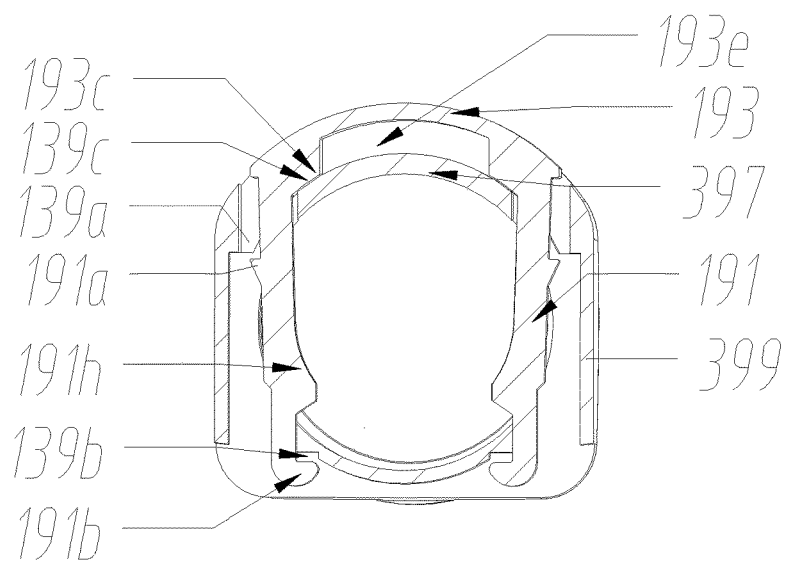
FIG. 7 is a cross-sectional schematic view of the self-locking member of FIG. 1 in an assembled state.

Please refer to FIG. 7, which is a sectional view under the assembled slate of the self-locking member of FIG. 1. The self-locking member 19 is accommodated in the self-locking accommodating portion 39, and is configured for controlling the detachment of the insertion tube 11, that is, for restricting the movement of the insertion tube 11. The self-locking member 19 includes two limiting arms 191 and an elastic bending portion 193, and the two limiting arms 191 are fixed at the ends of the elastic bending portion 193.

The limiting arm 191 has a rod-like structure. In order to make better use of the space of the self-locking accommodating portion 39, the limiting arm 191 may be an arc-shaped rod or a polygonal line-shaped rod that approximating to an arc shape. The number of tire limiting arms 191 is two, and a limiting protrusion 191h is provided and fixed to the side surface of each limiting arm 191 facing toward the other limiting arm 191. The surface of the limiting protrusion 191h that faces toward the insertion tube 11 is a curved surface or an inclined surface, so that the insertion tube 11 can be inserted into the receiving part 13 more easily. The surface of the limiting protrusion 191h facing away from the insertion tube 11 is a plane perpendicular to the axis of the insertion tube 11. The surface of the limiting protrusion 191h facing toward the other limiting protrusion 191h is a curved surface, the diameter of which is close to or equal to the outer diameter of the corresponding portion of the insertion tube 11, thereby better limiting the movement of the insertion tube 11. There are gaps between the limiting arms 191 and the receiving part 13 at the side of facing away from the axis of the insertion tube 11, that is, the gaps each are located between the limiting arms 191 and the connecting portions 399 respectively.

First anti-falling protrusions 191a is provided and fixed on the outer side of the middle portion of the limiting arms 191 respectively, and second anti-falling protrusions 191b are provided and fixed on the inner side of the free end of the limiting arms 191 respectively.

The elastic bending portion 193 is an arc-shaped plate-like structure with a rectangular cross-section. The elastic bending portion 193 has a certain elasticity, that is, the elastic bending portion 193 has the ability to generate deformation under stress and restore deformation when relieving the stress state by relying on its own elasticity. The elastic bending portion 193 is a plate-shaped structure being convex in a direction facing away from the axis of the insertion tube 11.

At the junctions between the elastic bending portion 193 and the limiting arms 191, two moving portions 193c are provided and fixed at inner sides facing towards each other of the two limiting arms 191, respectively. The side of the moving portion 193c adjacent to the limiting arm separating portion 397 is an inclined surface. When the inclined surface squeeze against the surface of the limiting arm separating portion 397 adjacent to the moving portion 193c, the two limiting arms 191 move away from each other.

In other embodiments of the disclosure, it can be provided and fixed at one of the elastic bending portion 193 and the limiting arm 191.

In other embodiments of the disclosure, the shape of the cross-section of the elastic bending portion 193 is not limited, and can be changed according to actual condition. For example, the shape of the cross-section of the elastic bending portion 193 can be square, circular, triangular, diamond, polygonal, irregular, or the like.

Referring to FIG. 2, under the assembled state of the detachable plug-in connector of this embodiment, the insertion tube 11 is inserted into the receiving part 13, the inner O ring 171, the spacer ring 173, the outer O ring 175, and the outer baffle-ring 177 are arranged in sequence along the axis of the insertion tube 11, in the direction toward the insertion tube 11. It should be noted that due to diameter of the inner O ring 171 and the outer O ring 175 is larger than the gap between the receiving part 13 and the corresponding position of the insertion tube 11, a certain pressure is formed among the inner surface of the receiving part 13, the outer surfaces of the inner O ring 171, the outer O ring 175, and the smooth insertion tube 11, so that a very good sealing effect is achieved. Baffle restriction 177e of the outer baffle ring 177 cooperates with the baffle engaging portion 137e to achieve a fixed position of the outer baffle ring 177. The lock engaging portion 11h cooperates with the limiting protrusion 191h to achieve a fixed position of the insertion tube 11.

Figure 8:
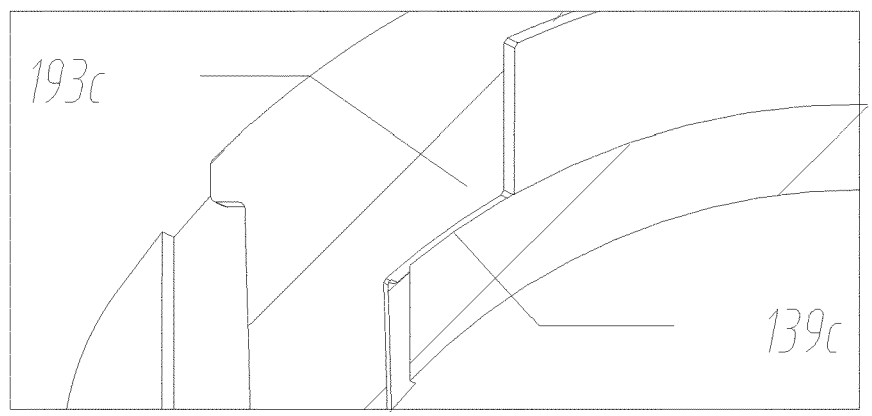
FIG. 8 is a partial enlarged view of a moving portion of FIG. 7.

FIG. 8 is a partial enlarged view of the moving portion 193c of FIG. 7. Referring to FIGS. 7 and 8, the details of the insertion of the self-locking member 19 into the receiving part 13 is described as follows.

The surface of the first anti-falling protrusion 191a contacted with the connecting portion 399 is an inclined plane, winds configured for guiding the insertion of the first anti-falling protrusion 191a. The surface of the second anti-falling protrusion 191b contacted with the limiting arm limiting portion 395, the limiting arm separating portion 397, and the connecting portion 399 is a curved surface, which is configured for guiding the insertion of the second anti-falling protrusion 191b. Two opposite side surfaces of the limiting protrusion 191h contacted with the limiting arm separating portion 397 and the connecting portion 399 are inclined planes, which is capable of guiding the insertion of the limiting protrusion 191h.

The surface of the moving portion 193c in contact with the limiting arm separating portion 397 is an inclined plane, which is configured for guiding the elastic bending portion 193 to be flattened and the two limiting arms 191 to move backwards.

Through holes that can pass through the limiting arms 191 respectively are formed between the limiting arm limiting portion 395, the limiting arm separating portion 397, and the connecting portions 399.

There are gaps between the limiting arms 191 and the connecting portions 399, the gaps are used to make the two limiting arms 191 have enough space to be separated, so that the insertion tube 11 can be pulled out from the receiving part 13.

In order to obtain a better anti-falling effect, the surface of the first engaging protrusion 139a facing the limiting arm limiting portion 395 is attached to the surface of the first anti-falling protrusion 191a facing the elastic bending portion 193. A lower surface 139b of the limiting arm limiting portion 395 is attached to the surface of the second anti-falling protrusion 191b facing the elastic bending portion 193.

In order to prevent the possibility of accidental pressure on the self-locking member 19, after the self-locking member 19 is fully installed into the receiving part 13, the self-locking member 19 is shielded by the outer wall 391 and the inner wall 393, the cross-section of the self-locking member 19 is not greater than the cross-section of the outer wall 391, and also not greater than the cross-section of the inner wall 393, the cross-sections here refer to the cross-sections in the direction perpendicular to the axis of the insertion tube 11.

In order to achieve a better effect of separating the limiting arm, the surface of the limiting arm separating portion 397 facing the elastic bending portion 193 is attached to the surface of the moving portion 193c facing away from the elastic bending portion 193.

Between the elastic bending portion 193 and the limiting arm separating portion 397, there is a gap for flattening the elastic bending portion 193. In the direction along the axis of the insertion tube 11, the length of the elastic bending portion 193 may be greater than the length of the limiting arm 191. As such, the elastic bending portion 193 may have a larger pressing surface, i.e., a larger contact area for pressing.

When the self-locking member 19 is required to be installed into the receiving part 13, the limiting arm 191 is inserted into the socket formed among the connecting portions 399, the inner wall 393, and the outer wall 391, and the installation is completed. Of course, the self-locking member 19 can be installed at the last step in the installation process.

After the self-locking member 19 is inserted into the receiving part 13, the second anti-falling protrusions 191b are located in grooves formed by the outer wall 391, the inner wall 393, and the surface of the limiting arm limiting portion 395 facing away from the elastic bending portion 193. So the limiting arms 191 can be detached by separating the second anti-falling protrusions 191b.

During the insertion of the insertion tube 11, the inserting guide portion 113 allows the insertion tube 11 to enter the receiving part 13 very easily. The surface of the limiting protrusion 191h facing toward the lock engaging portion 11h is a curved surface or an inclined surface, to achieve a guiding function. Therefore, the limiting protrusion 191h can be easily limited by the lock engaging portion 11h. In order to more easily achieve the position limitation, the surface of the lock engaging portion 11h facing toward the limiting protrusion 191h is provided with an inclined surface or a curved surface, that is, the diameter of the lock engaging portion 11h is reduced toward the direction of the limiting protrusion 191h.

When the elastic bending portion 193 is pressed in the insertion direction of the self-locking member 19, the moving portions 193c are in contact with the limiting arm separating portion 397, the pressure there between guides the elastic bending portion 193 to be flattened, and the two limiting arms 191 move backwards. The elastic bending portion 193 gradually flattens, that is, the distance between the two limiting arms 191 gradually increases as the elastic bending portion 193 gradually flattens. At this time, the two limiting arms 191 are fully opened, that is, the insertion tube 11 can be pulled out from the receiving part 13.

Figure 9:
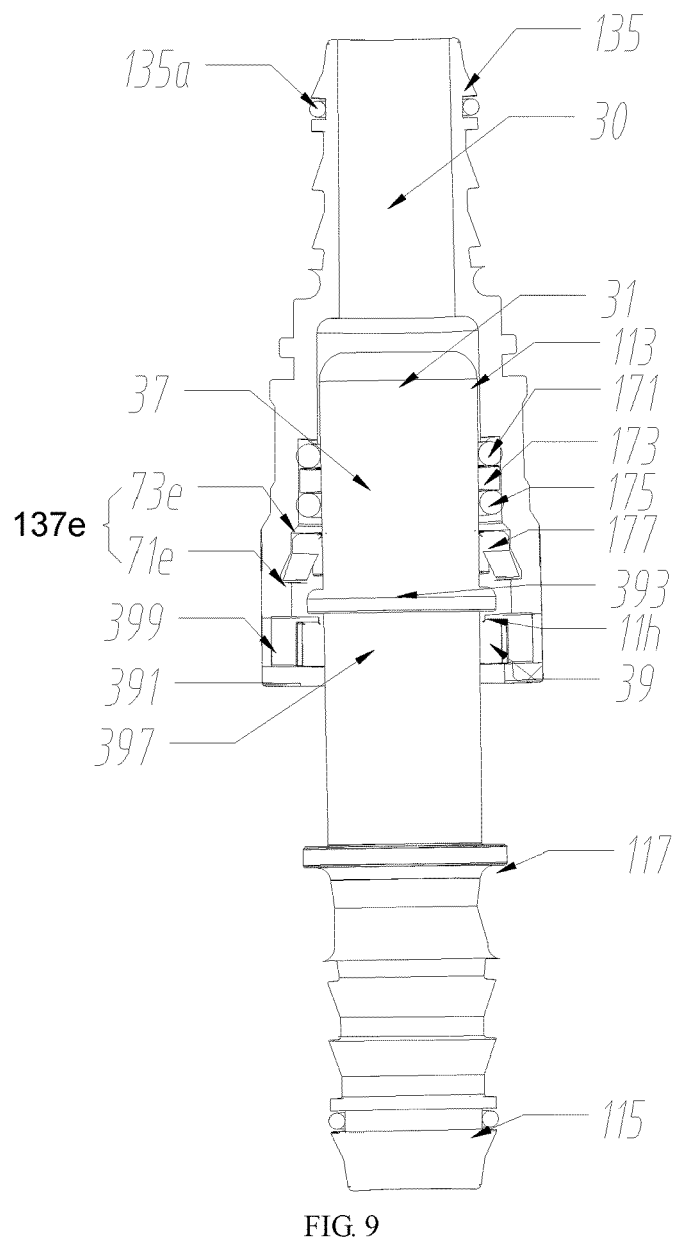
FIG. 9 is a cross-sectional schematic view of a detachable plug-in connector in an assembled state, according to a second embodiment of the disclosure.
Figure 10:
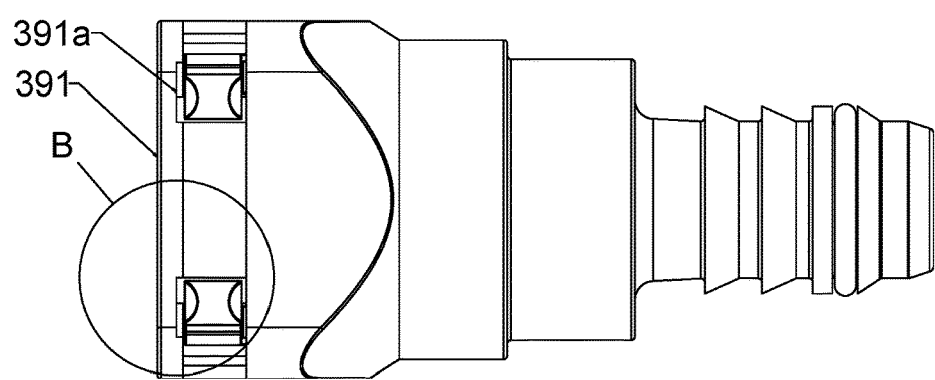
FIG. 10 is a schematic structural view of a receiving part according to a third embodiment of the disclosure.
Figure 11:
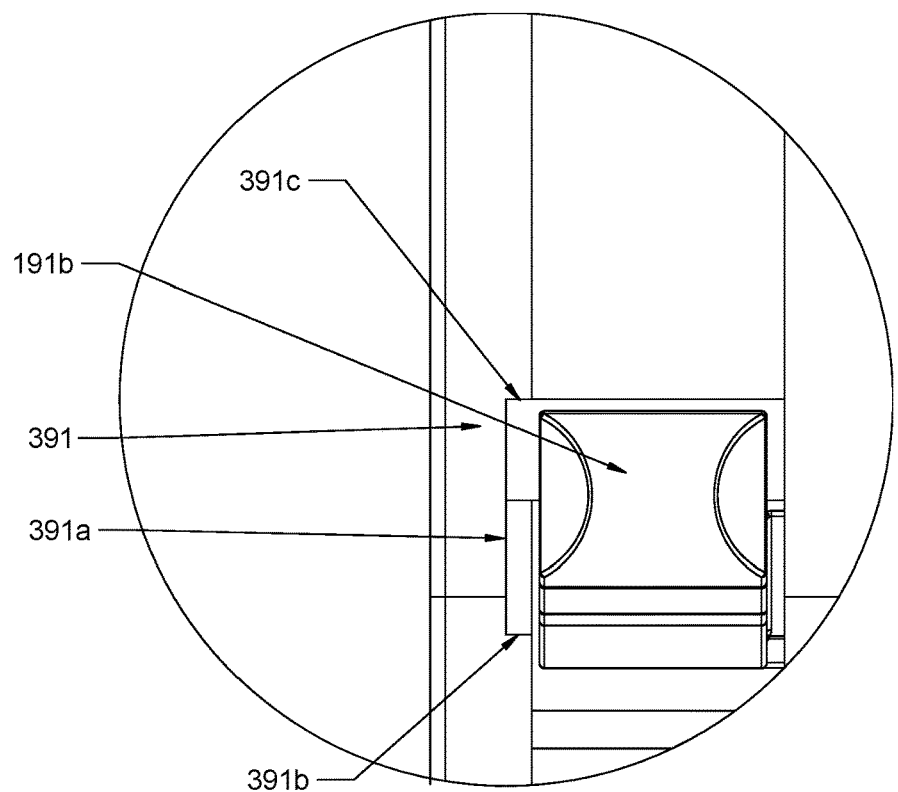
FIG. 11 is a partial enlarged view of the receiving part of FIG. 10.
Figure 12:
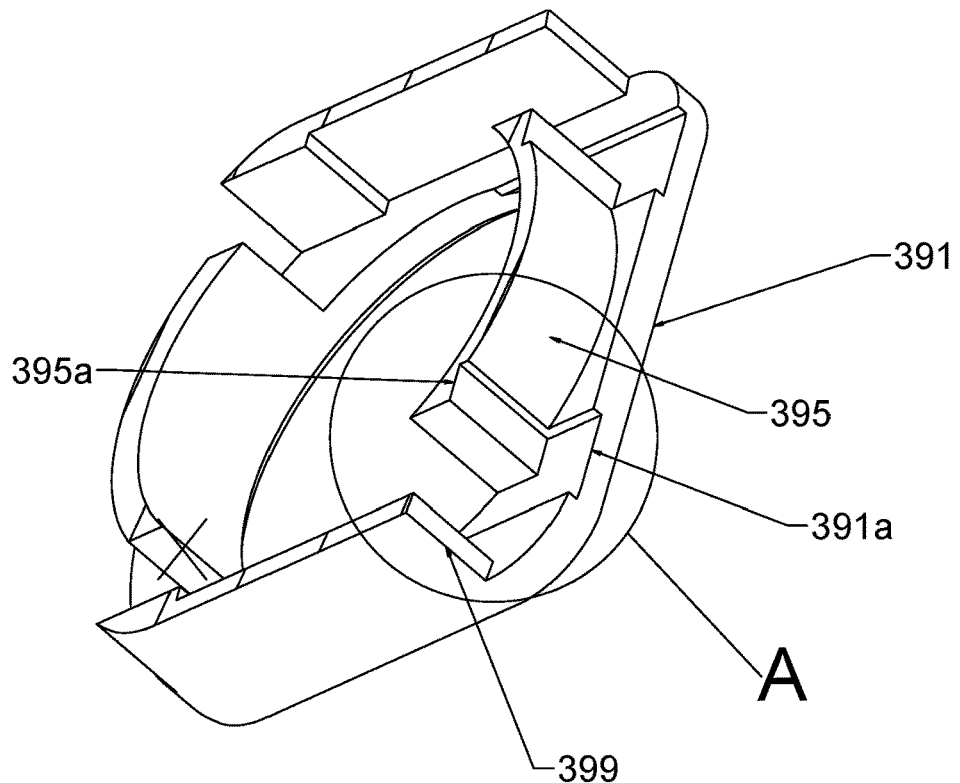
FIG. 12 is a cutaway perspective structural view of the receiving part of FIG. 10.
Figure 13:
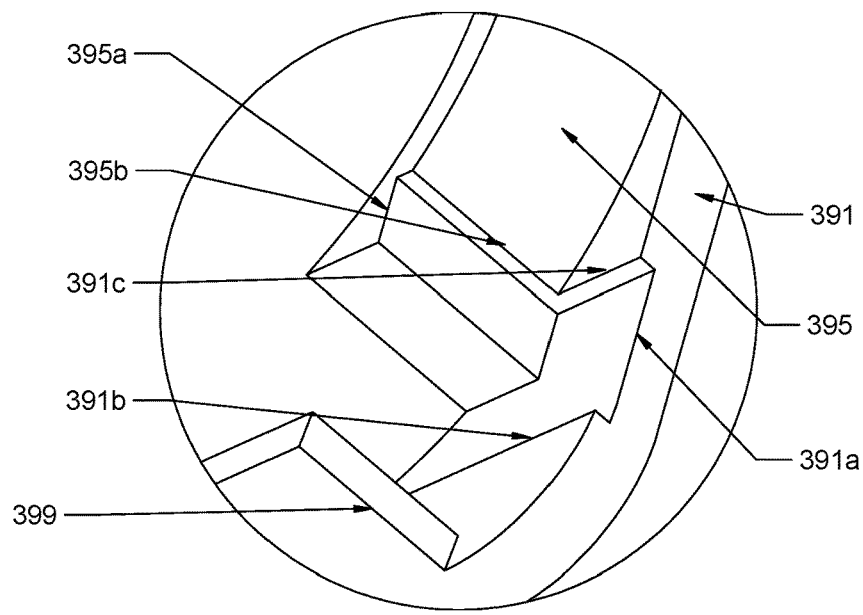
FIG. 13 is a cross-sectional view of the receiving part of FIG. 10.
Figure 14:
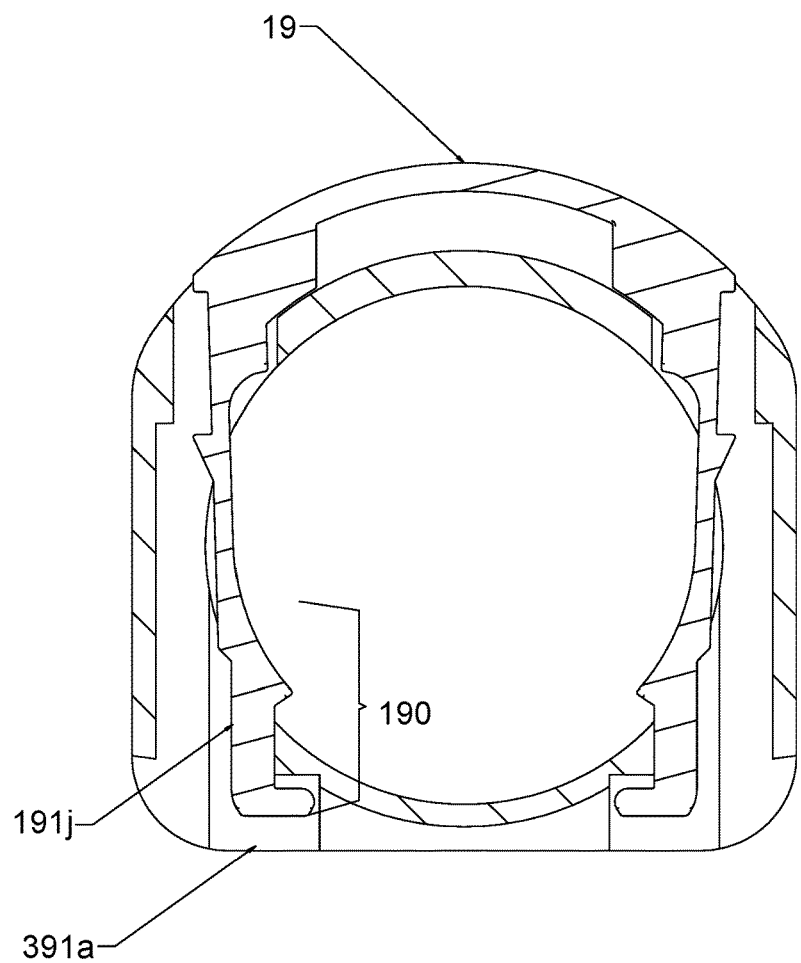
FIG. 14 is a partial enlarged view of the receiving part of FIG. 13.

FIG. 9 is a schematic cross-sectional view of a detachable plug-in connector under an assembled state according to a second embodiment of the disclosure. Referring to FIG. 9, the structure and principle of the detachable plug-in connector of the second embodiment is similar to that of the first embodiment.

The difference between the two embodiments is that the number of seal protrusion 135 is different, there are a number of seal protrusions 135 provided in the second embodiment. Rubber rings are provided and each rubber ting is sandwiched between two adjacent seal protrusions 135, so that a sealing effect between the hose and the seal protrusions is better.

Referring to FIGS. 11-14, the structure and principle of the detachable plug-in connector of a third embodiment is similar to that of the first embodiment, and the differences are briefly described below.

The outer wall 391 defines grooves 391a, and the grooves 391a each define a first side wall 391b and a second side wall 391c.

When the lock engaging portion 11h squeezes against the limiting protrusions 191h of the limiting arms 191, the lower half 190 of each of the limiting arms 191 is received in the corresponding groove 391a, and the first side wall 391b of the groove 391a cooperates with a limiting arm outer surface 191j of the corresponding limiting arm 191, to limit a movement of the limiting arm 191 in the direction of away from the insertion tube 11, that is, to prevent the limitation of the limiting protrusion 191h applied to the lock engaging portion 11h from failing.

In other embodiments, the grooves 391a may penetrates through the outer wall 391.

The applicant conducted an experiment in accordance with the relevant test requirements for the 6.3 pull-out force of the SAE J2044-2009, "quick connect coupling specification for liquid fuel and vapor/emissions systems" issued and implemented in August 2009. In the case where the depth of the groove 391a is only 0.5 mm (50 filaments), the pull-out force is increased by 1 to 1.5 times with respect to the technical design without the groove 391a. For detail data of the experiment, see FIG. 15.

Optionally, the connecting portion 395 has stepped edges 395a communicating with the grooves 391a respectively, and third side walls 395b of the stepped edges 395a and the second side walls 391c of the grooves 391a are located on the same plane. In this way, even the insertion tube 11 is shaken, the position of the limiting arms 191 can be ensured when the lock engaging portion 11h squeezes against the limiting protrusions 191h.

Figures 15, 16:
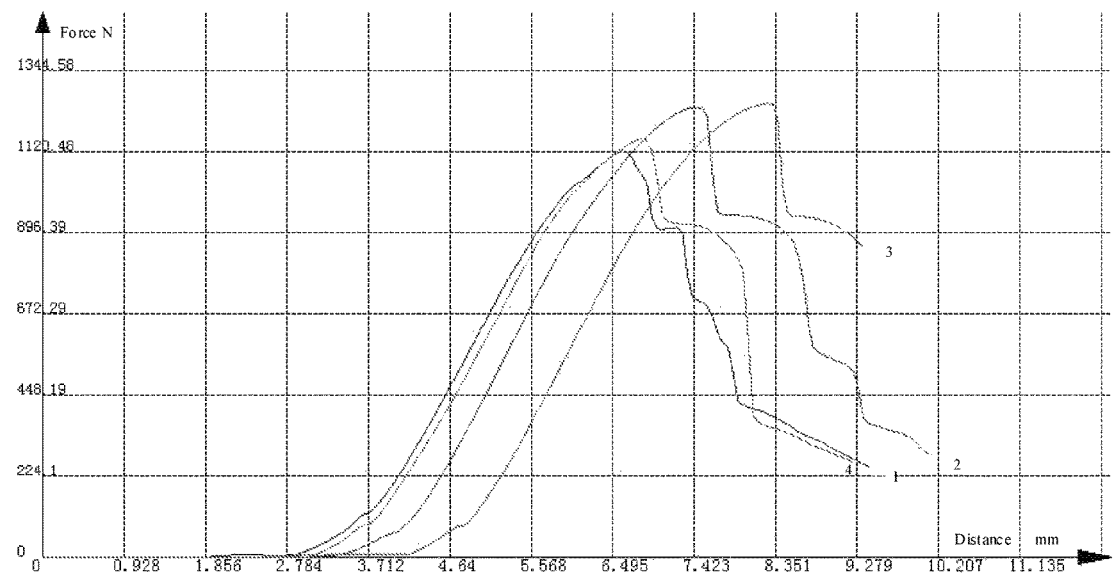
FIG. 15 shows pull-out force experimental data of the detachable plug-in connector of the third embodiment of the disclosure.
FIG. 16 shows a stress-strain diagram with respect to pull-out force of the detachable plug-in connector according to the third embodiment of the disclosure.
Figures 17, 18:
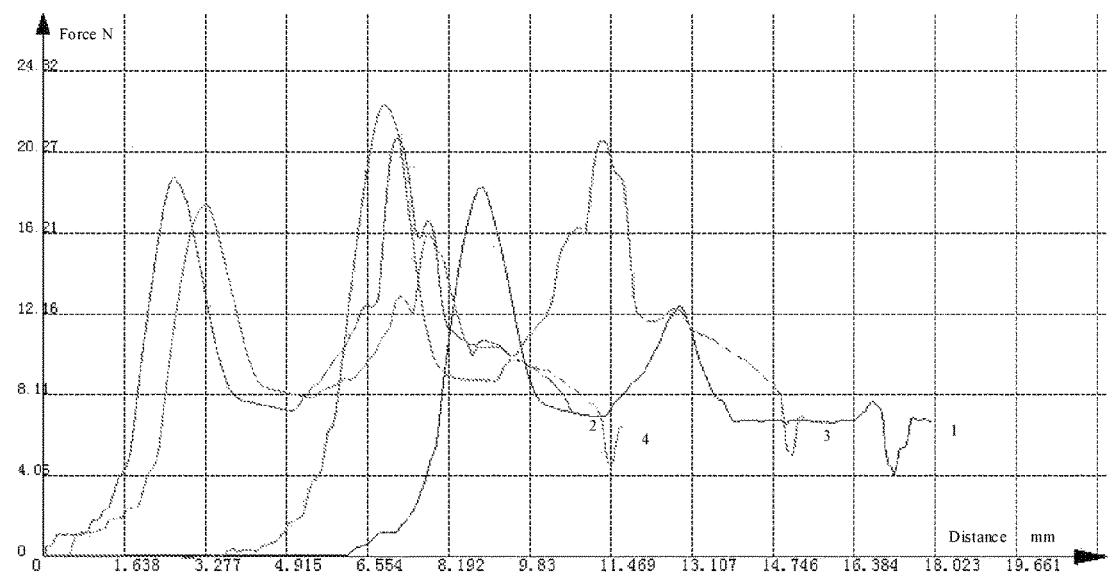
FIG. 17 shows insertion force experimental data of the detachable plug-in connector of the first embodiment of the disclosure.
FIG. 18 shows a stress-strain diagram with respect to insertion force of the detachable plug-in connector of the first embodiment of the disclosure.

FIG. 15 shows pull-out force experimental data of the detachable plug-in connector of the third embodiment of the disclosure. FIG. 16 shows a stress-strain diagram with respect to pull-out force of the detachable plug-in connector according to the third embodiment of the disclosure. FIG. 17 shows insertion force experimental data of the detachable plug-in connector of the first embodiment of the disclosure. FIG. 18 is a stress-strain diagram with respect to insertion force of the detachable plug-in connector of the first embodiment of the disclosure. The specific experimental conditions are in accordance with SAE J2044-2009, regarding 6.2 insertion force and 6.3 pull-out force, and a sleeve with 15.82 mm diameter is adopted.

The details of the experiment regarding the pull-off force are as follows. Test plan: determination method of pull-out force process capability. Calculation standard: SAE J2044-2009. Sample shape: profiled material. Test date: 2016 Jan. 7 13:50:12. Test time: 49.400002 s. Test speed: 51 mm/min. Product number PN: H1. Product description: 15.82-ID14 curved cathode fuel quick connector. Engineering change level: A0. Number of cavity: two. Department: quality department. Factory Plant: Linhai Yongheng Auto Parts Technology Co., Ltd. Equipment EQP: universal material tensile testing machine.

The details of the experiment regarding the insertion force are as follows. Test plan: determination method of insertion process capability. Calculation standard: SAE J2044-2009. Sample shape: profiled material. Test date: 2016 Jan. 7 13:40:18. Test time; 69.80003 s. Test speed: 51 mm/min. Product number PN: H1. Product description: 15.82-ID14 straight cathode fuel quick connector. Engineering change level: A0. Number of cavity: two. Department: technical department. Factory Plant: Linhai Yongheng Auto Parts Technology Co., Ltd. Equipment EQP: universal material tensile testing machine.

The detachable plug-in connector of the disclosure has a pull-out force and an insertion force that are obviously superior to the requirements of the quick connector specification of the fuel and steam/evaporation system, it is easy to be inserted into and difficult to be pulled out.

In one embodiment of the detachable plug-in connector of the disclosure, the width of one of the elastic bending portion, the limiting arm, and the moving portion, is equal to or slightly greater than the distance between the inner wall and the outer wall.

In other embodiments, the bent direction of the elastic bending portion 193 may be opposite to the bent direction of the elastic bending portion 193 of the first embodiment, and the elastic bending portion 193 is just required to have the ability to increase the distance between the two ends in a stressed state.

In other embodiments of the disclosure, the first anti-failing protrusion 191a and the second anti-falling protrusion 191b are not necessary.

In one embodiment of the detachable plug-in connector of the disclosure, the removable plug-in connector includes:
  an insertion tube having a lock engaging portion;
  a receiving part, wherein the insertion tube is inserted into the receiving part, and the insertion tube is sealedly and detachably assembled with the receiving part; and
  a self-locking member being accommodated in the receiving part and cooperating with the lock engaging portion to limit a moving range of the insertion tube;
  wherein the self-locking member includes:
  two limiting arms each having a limiting protrusion and a free end;
  an elastic bending portion having two ends cos nice led and fixed to two limiting arms respectively; and
  two moving portions being located at inner sides facing towards each other of the two limiting arms, and each fixed at the junctions of the limiting arms and the elastic bending portion;
  wherein the receiving part includes:
  a limiting arm separating portion located between the two limiting arms;
  wherein the moving portions squeeze against the limiting arm separating portion when the elastic bending portion is pressed, and thereby the two limiting arms move away from each other to release a limiting of the self-locking member applied to the insertion tube.

In one embodiment of the detachable plug-in connector of the disclosure, the surface of the moving portion adjacent to the limiting arm separating portion is an inclined surface.

In one embodiment of the detachable plug-in connector of the disclosure, the elastic bending portion is a plate-shaped structure that is bent away from the axis of the insertion tube.

In one embodiment of the detachable plug-in connector of the disclosure, the receiving part further includes an outer wall, an inner wall, and connecting portions each with a plate-shaped structure.

The outer wall and the inner wall are perpendicular to the axis of the insertion tube, and the connection portions are parallel to the axis of the insertion tube.

The connecting portions connect the outer wall and the inner wall to form a space for accommodating the self-locking member.

The insertion tube passes through the outer wall and the inner wall.

In one embodiment of the detachable plug-in connector of the disclosure, the connection portions are provided with first engaging protrusions at the surface thereof adjacent to the limiting arms.

First anti-falling protrusions are fixed on sides of the limiting arms adjacent to the connecting portions respectively.

The first engaging protrusions cooperate with the first anti-falling protrusions to prevent the self-locking member from dropping out of the receiving part.

In one embodiment of the detachable plug-in connector of the disclosure, the receiving part further includes a limiting arm limiting portion fixed between the outer wall and the inner wall, and the limiting arm limiting portion also is located between the two limiting arms.

Second anti-falling protrusions are respectively fixed on the inner sides facing toward each other of the free ends of the two limiting arms away from the elastic bending portion, and the second anti-falling protrusions pass through gaps formed by the limiting arm limiting portion and the connecting portions.

The limiting arm limiting portion cooperates with the second anti-falling protrusions to prevent the self-locking member from dropping from the receiving part.

In one embodiment of the detachable plug-in connector of the disclosure, there is a space between the elastic bending portion and the limiting arm separating portion to accommodate the flattened elastic bending portion when being pressed.

In one embodiment of the detachable plug-in connector of the disclosure, the limiting arm separating portion is a curved plate-shaped structure being convex in a direction facing away from the axis of the insertion tube.

In one embodiment of the detachable plug-in connector of the disclosure, the insertion tube and/or the receiving part and/or the self-locking member are made of glass fiber-modified nylon.

In summary, the detachable plug-in connector of the disclosure has at least the following advantages.

In the detachable plug-in connector of the disclosure, since the self-locking member includes an elastic bending portion and two limiting arms, the structure of the self-locking member is simple and easy to be installed.

In an embodiment of the detachable plug-in connector of the disclosure, due to the diameter of the inner O ring and the outer O ring is larger than the gap between the receiving part and the corresponding position of the insertion tube, a certain pressure is formed among the inner surface of the receiving part, the inner O ring, the outer O ring, and the smooth outer surface of the insertion tube, so that a very good sealing effect is achieved.

In one embodiment of the detachable plug-in connector of the disclosure, the outer baffle ring can be rotated very conveniently due to the provision of the rotating portion until it is installed in place.

In one embodiment of the detachable plug-in connector of the disclosure, the width of the elastic bending portion or the limiting arm or the moving portion is equal to or slightly greater than the distance between the inner wall and the outer wall. In this way, the elastic bending portion or the limiting arm or the moving portion forms a certain factional force between the inner wall and the outer wall to prevent the self-locking member from falling off or loosening.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A detachable plug-in connector (10), comprising:
    an insertion tube (11) comprising a lock engaging portion (11h);
    a receiving part (13), wherein the insertion tube (11) is inserted into the receiving part (13), and the insertion tube (11) is sealedly and detachably assembled with the receiving part (13); and
    a self-locking member (19), wherein the self-locking member (19) is accommodated in the receiving part (13) and cooperates with the lock engaging portion (11h) to limit a moving range of the insertion tube (11);
    wherein the self-locking member (19) comprises:
        two limiting arms (191), wherein each of the two limiting arms (191) has a limiting protrusion (191h) and a free end,
        an elastic bending portion (193), wherein two ends of the elastic bending portion (193) respectively are fixedly connected to the limiting arms (191), and
        two moving portions (193c), wherein the two moving portions (193c) are fixed at connections between the limiting arms (191) and the elastic bending portion (193), and the two moving portions (193c) are located at inner sides facing towards each other of the two limiting arms (191);
    wherein the receiving part (13) comprises:
        a limiting arm separating portion (397) positioned between the two limiting arms (191),
        an outer wall (391),
        an inner wall (393), and
        a connecting portions (399), the connecting portions (399) connecting the outer wall (391) and the inner wall (393) to form a space for accommodating the self-locking member (19), the outer wall (391) is defined with grooves (391a);
    wherein the moving portions (193c) and the limiting arm separating portion (397) squeeze against each other when the elastic bending portion (193) is pressed, and thereby the two limiting arms (191) move away from each other to release a limiting of the self-locking member (19) applied to the insertion tube (11);
    wherein when the lock engaging portion (11h) squeezes against the limiting protrusions (191h) of the limiting arms (191), the limiting arms (191) are partially accommodated in the grooves (391a), and first side walls (391b) of the grooves (391a) cooperate with limiting arm outer surfaces (191j) of the limiting arms (191) to limit a movement of the limiting arms (191) in a direction away from the insertion tube (11).

2. The detachable plug-in connector (10) according to claim 1, wherein surfaces of the moving portions (193c)

adjacent to the limiting arm separating portion (397) are inclined surfaces, and the elastic bending portion (193) is a plate-shaped structure bent towards a direction facing away from an axis of the insertion tube (11).

3. The detachable plug-in connector (10) according to claim 2, wherein the outer wall (391) and the inner wall (393) are both perpendicular to the axis of the insertion tube (11), and the connecting portions (399) are parallel to the axis of the insertion tube (11);

wherein the insertion tube (11) passes through the outer wall (391) and the inner wall (393), each of the outer wall (391), the inner wall (393) and the connecting portions (399) is a plate-shaped structure.

4. The detachable plug-in connector (10) according to claim 3, wherein first engaging protrusions (139a) are defined at surfaces of the connecting portions (399) adjacent to the limiting arms (191) respectively;

wherein first anti-falling protrusions (191a) are fixed on sides of the limiting arms (191) adjacent to the connecting portions (399) respectively;

wherein the first engaging protrusions (139a) cooperate with the first anti-falling protrusions (191a) to prevent the self-locking member (19) from dropping out of the receiving part (13).

5. The detachable plug-in connector (10) according to claim 3, wherein the receiving part (13) further comprises a limiting arm limiting portion (395) fixed between the outer wall (391) and the inner wall (393), and the limiting arm limiting portion (395) also is located between the two limiting arms (191); wherein second anti-falling protrusions (191b) are respectively fixed on the inner sides facing toward each other of the free ends of the two limiting arms (191) away from the elastic bending portion (193), and the second anti-falling protrusions (191b) pass through gaps formed by the limiting arm limiting portion (395) and the connecting portions (399); wherein the limiting arm limiting portion (395) and the second anti-falling protrusions (191b) cooperate with each other to prevent the self-locking member (19) from dropping out of the receiving part (13).

6. The detachable plug-in connector (10) according to claim 3, wherein there is a space between the elastic bending portion (193) and the limiting arm separating portion (397) to allow the elastic bending portion (193) to be flattened when being pressed.

7. The detachable plug-in connector (10) according to claim 6, wherein surfaces of the limiting protrusions (191h) facing toward the outer wall (391) are inclined surfaces or curved surfaces and configured for guiding the insertion of the insertion tube (11), surfaces of the limiting protrusions (191h) facing away from the outer wall (391) are planes perpendicular to the axis of the insertion tube (11).

8. The detachable plug-in connector (10) according to claim 7, wherein the limiting arm separating portion (397) is a curved plate-shaped structure being convex in a direction facing away from the axis of the insertion tube (11).

9. The detachable plug-in connector (10) according to claim 1, wherein at least one of the insertion tube (11), the receiving part and the self-locking member (19) is/are made of a glass fiber modified nylon.

* * * * *

UNITED STATES PATENT AND TRADEMARK OFFICE
CERTIFICATE OF CORRECTION

PATENT NO. : 10,404,013 B2
APPLICATION NO. : 16/028357
DATED : September 3, 2019
INVENTOR(S) : Huiming Zhang et al.

It is certified that error appears in the above-identified patent and that said Letters Patent is hereby corrected as shown below:

On the Title Page

Replace the assignee data with the following:
-- (73) Assignee: LINHAI YONGHENG AUTO TECHNOLOGY CO., LTD., Taizhou (CN) --

Signed and Sealed this
Tenth Day of December, 2019

Andrei Iancu
*Director of the United States Patent and Trademark Office*